United States Patent [19]

Eshima

[11] Patent Number: 5,141,326
[45] Date of Patent: Aug. 25, 1992

[54] BARRIER SCREW

[75] Inventor: Mitsuaki Eshima, Mishima, Japan

[73] Assignee: Toshiba Kikai Kabushiki Kaisha, Tokyo, Japan

[21] Appl. No.: 753,080

[22] Filed: Aug. 30, 1991

[30] Foreign Application Priority Data

Aug. 31, 1990 [JP] Japan .................. 2-231842
Mar. 28, 1991 [JP] Japan .................. 3-89480

[51] Int. Cl.⁵ .............................. B29B 7/42
[52] U.S. Cl. ...................... 366/088; 366/89; 425/208
[58] Field of Search ............ 425/208; 366/88, 89, 366/323

[56] References Cited

U.S. PATENT DOCUMENTS

| Re. 28,901 | 7/1976 | Kim | 366/88 |
|---|---|---|---|
| 3,271,819 | 9/1966 | Lacher | 366/89 |
| 3,650,652 | 3/1972 | Dray et al. | 425/208 |
| 3,652,064 | 3/1972 | Lehnen et al. | 425/208 |
| 4,000,884 | 1/1977 | Chung | 366/88 |
| 4,128,341 | 12/1978 | Hsu | 366/323 |
| 4,171,196 | 10/1979 | Maillefer | 425/208 |
| 4,227,870 | 10/1980 | Kim | 425/208 |
| 4,277,182 | 7/1981 | Kruder | 425/208 |
| 4,280,802 | 7/1981 | Lang et al. | 425/208 |
| 4,285,600 | 8/1981 | Kruder | 425/208 |
| 4,341,474 | 7/1982 | Wheeler, Jr. et al. | 366/88 |
| 4,733,970 | 3/1988 | Vohana | 425/208 |
| 4,752,136 | 6/1988 | Colby | 366/89 |
| 4,770,539 | 9/1988 | Hedthe | 366/88 |
| 4,944,906 | 7/1990 | Colby et al. | 425/208 |

FOREIGN PATENT DOCUMENTS 61-141523 6/1986 Japan .
61-144326 7/1986 Japan .

Primary Examiner—David A. Simmons
Assistant Examiner—W. Jackson Matney, Jr.
Attorney, Agent, or Firm—Cushman, Darby & Cushman

[57] ABSTRACT

A barrier screw having a feed zone, a compression zone and a metering zone, the screw including a shaft, a main flight provided on the shaft and a subflight provided on the shaft. The subflight is developed on the compression zone and then joins with a rear surface of the main flight prededing the subflight by one pitch at an end portion of the metering zone. The subflight defines a melt channel whsoe depth is substantially constant, so that the mixing function of the screw is improved.

6 Claims, 5 Drawing Sheets

BARRIER SCREW

BACKGROUND OF THE INVENTION

The present invention relates to a plastic material screw used for an injection molding machine, an extruder or a blow molding machine or the like, and more particularly, to a barrier screw having a subflight which is a type of barrier for separating melted material from unmelted material.

Recently, a barrier screw which comprises a standard single threaded full flight and a subflight, is used for improving the plasticate capacity and the mixing effect of the material. This type of barrier screw has the subflight in a melt zone of a middle portion of the screw. According to the conventional barrier screw, plastic material gradually melted in the melt zone is separated from unmelted solid material, and then the solid material starts to melt. After all of the material has been melted, the melted material is fed to a metering zone located at a most downstream portion of the screw.

In a conventional barrier screw having a subflight, the melted material passes over the top of the subflight and then the melted material is mixed together in a melt channel defined by the subflight. However, the conventional screw has the following drawbacks.

Namely, in the conventional barrier screw, a barrel internal pressure in a solid channel defined by the full flight is high and on the other hand, a barrel internal pressure in the melt channel and in particular a barrel internal pressure at the start portion of the melt channel are low. Furthermore, as the subflight functions as a gas barrier, gas from the melted material in the melt channel cannot be sufficiently purged. Therefore, defects such as silver streaks or the like are formed on the surfaces of moldings.

In the case of a plastic material capable of being easily resolved, burning spots may be caused in the melt channel because of material remaining in the melt channel. Furthermore, as the material moves from the solid channel into the melt channel immediately after being melted, the material and the pigment contained therein cannot sufficiently mix in the solid channel. Therefore, the color dispersion of the pigment is not sufficiently performed.

In order to eliminate the above mentioned drawbacks, there has been proposed a barrier screw which has another mixing barrier in the metering zone in addition to the subflight. However, this type of barrier screw is too long and too expensive because it is required to form double-threaded long grooves on the screw by using sophisticated working technology and many man-hours.

SUMMARY OF THE INVENTION

It is therefore an object of the present invention to provide a barrier screw which can more adequately melt and mix plastic material, and more uniformly plasticize the plastic material so as to prevent defects such as a silver streaks or burning spots.

According to one aspect of the present invention, there is provided a barrier screw having a feed zone, a compression zone, and a metering zone comprising: a shaft; a main flight provided on the shaft, and extending from a start portion of the feed zone to an end portion of the metering zone, and defining a feed channel; and a subflight provided on the shaft, extending from a point of the compression zone to a point of the metering zone, and having a larger lead angle than the main flight; the subflight diverging from the main flight at the point of the compression zone, joining with the main flight at the point of the metering zone, and defining a melt channel; the melt channel having a substantially constant depth along the whole length of the subflight.

According to another aspect of the present invention, there is provided a barrier screw wherein, preferably the subflight is developed at a bottom of a front surface of the main flight at the point of the compression zone, a height and a width of the subflight are gradually increased to a predetermined height and a predetermined width for one or more pitches, and the melt channel is developed after the height and the width of the subflight reach the predetermined height and the predetermined width.

According to still another aspect of the present invention, there is provided the barrier screw wherein a difference between a top of the main flight and a top of the subflight may be substantially constant along the whole length thereof, however it is preferably decreased towards the end portion of the metering zone.

According to still another aspect of the present invention, there is provided the barrier screw wherein the subflight is a first subflight joining with the main flight at the point of the metering zone, and a second subflight is developed from a vicinity of the joining point of the first subflight and extends toward the end portion of the metering zone by one or more than one pitches.

According to still another aspect of the present invention, there is provided the barrier screw wherein the second subflight comprises several distinct portions which are formed in a stepped manner, and a difference between a top of the main flight and a top of the second subflight is smaller than a difference between the top of the main flight and a top of the first subflight.

According to the present invention, unmelted plastic material fed from the feed zone is gradually compressed to be melted in the feed channel of the compression zone, and then the plastic material is further compressed and mixed by the subflight developed in the compression zone. The plastic material is moved from the feed channel into the melt channel, where the plastic material is further mixed together and gas from the plastic material is sufficiently purged. Since the depth of the melt channel is substantially constant and the helical width of the melt channel is increased, the plastic material moved into the melt channel is sufficiently mixed and uniformly plasticized, and then the plastic material reaches the end portion of the metering zone. Therefore, burning spots due to remaining material are prevented.

Furthermore, in the case that the subflight comprises the first and second subflight, the plastic material melted and mixed by the first subflight is further mixed when the plastic material passes over the second subflight, therefore the color dispersion of the material is improved.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE INVENTION

A barrier screw of the present invention will be described below with reference to FIGS. 1 through 4.

Figure 1A:
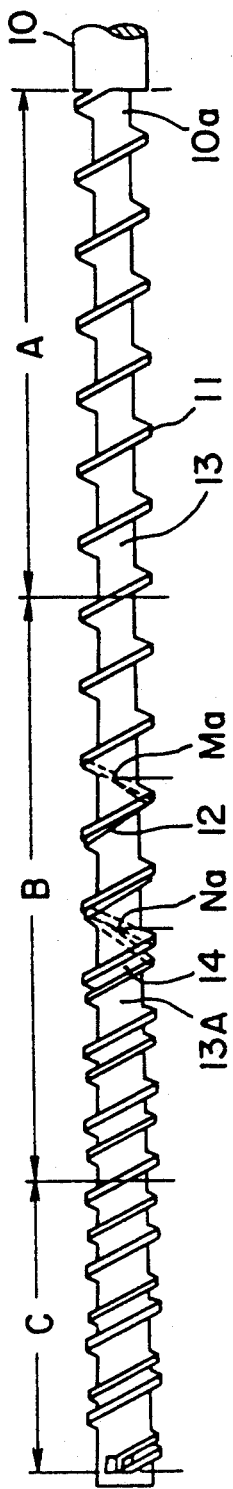
FIG. 1 is a side view showing a barrier screw according to a first embodiment of the present invention.

FIG. 1A shows a profile of a barrier screw 10 according to a first embodiment of the present invention. In FIG. 1A, the character A indicates a feed zone of the barrier screw, the character B indicates a compression zone and the character C indicates a metering zone.

Figure 1B:
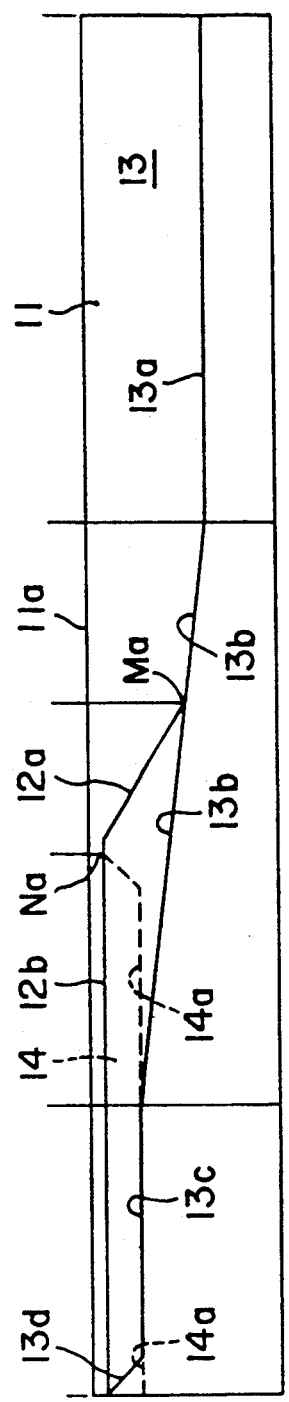
Figure 1C:
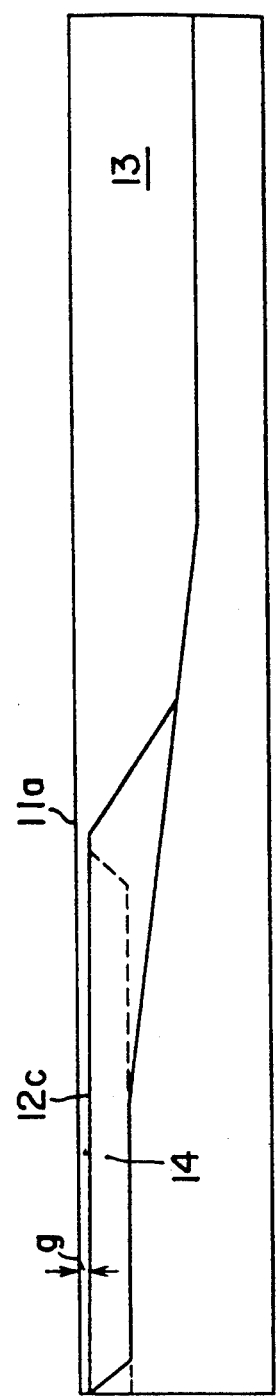

A single threaded main flight 11 or multiple threaded main flights 11 are provided on a shaft 10a, and extend along the whole length from the feed zone A to the metering zone C (only the single threaded main flight 11 is shown in FIG. 1A). A subflight 12 is started from a point Ma of the compression zone B. The subflight 12 is developed at a bottom of a front surface of the main flight 11, and the width and the height of the subflight 12 are gradually increased. The height of the subflight 12 reaches a predetermined level at the first two pitches, as shown by the line 12a in FIG. 1B. In FIG. 1B, the line 11a indicates a top of the main flight 11 or the height thereof, and the line 13a indicates a root of a feed channel 13 defined by the main flight 11 in the feed zone A or a depth thereof. The depth of the feed channel 13 in the compression zone B becomes smaller toward the metering zone C, as shown by the line 13b. The depth of the feed channel 13 in the metering zone C is substantially constant and relatively small, as shown by the line 13c. The root of the feed channel 13 around an end portion of the metering zone C rises rapidly and then joins with the top 12b of the subflight 12, as shown by the line 13d.

A melt channel 14 defined by the subflight 12 is developed from a point Na where the height of the subflight 12 reaches the predetermined level (12b) and the width thereof reaches a predetermined width. That is, the melt channel 14 is started from the point Na of the compression zone B.

A downstream portion of the feed channel 13 from the point Na is referred to as a solid channel 13A in comparison with the melt channel 14. The depth of the melt channel 14 is determined, while taking its mixing function into account. The depth of the melt channel 14 is substantially constant except for a start portion of the melt channel as shown by lines 14a, 14a in FIG. 1B. The depth of the melt channel 14 in the compression zone B is substantially the same as that in the metering zone C.

A root of the solid channel 13A in the metering zone C may be positioned at the same level as that of the melt channel 14. The roots of the solid channel 13A and the melt channel 14 are shown by the line 13c and the line 14a respectively. The positioning of the roots of the solid channel 13A and the melt channel 14 at the same level, however, is not always necessary.

In FIG. 1A, the subflight 12 has a larger lead angle than the main flight 11, and joins with a rear surface of the main flight 11 preceding the subflight 12 by one pitch around the end portion of the metering zone C.

According, the helical width of the melt channel 14 becomes wider towards the downstream, and the helical width of the solid channel 13A becomes narrower towards the downstream.

The operation of the barrier screw according to the present invention is as follows.

As the barrier screw is rotated, solid plastic material which is not melted is fed from a hopper (not shown) to the feed zone A. In the feed zone A, the plastic material is heated and fed downstream. As the plastic material enters the compression zone B, the plastic material begins to melt.

The L/D of the feed zone A (L: length of screw, D: outer diameter of screw) is determined in accordance with the type of the plastic material, and it is preferably set to 7 so that the plastic material can easily begin to melt around the entrance of the compression zone B.

The plastic material which starts to melt, is compressed and mixed together while moving in the compression zone B, and a portion of the plastic material is melted. The melted portion is further compressed and mixed together when the melted portion reaches the point Ma, because the subflight 12 is developed at the point Ma as shown in FIG. 1A. As the plastic material reaches the point Na around the middle portion of the compression zone B where the melt channel 14 is developed, the melted portion of the plastic material is thoroughly mixed together. The melted portion of the plastic material enters the melt channel 14 little by little over the top of the subflight 12.

In the solid channel 13A extending next to the melt channel 14, the plastic material partially containing a melted portion is pressed and then melted and mixed. Then, the melted and mixed portion contained by the solid plastic material is moved into the melt channel 14 little by little.

The melted portion of the plastic material entering the melt channel 14 is further mixed, because the depth of the melt channel is set to a value suitable for mixing. Next, the melted portion of the plastic material is fed to the metering zone C, and then further fed to the end portion of the barrier screw 10. At the same time, in the metering zone C the melted portion of the plastic material in the solid channel 13A enters the melt channel 14 over the top of the subflight 12, and then is mixed together to become more uniform. The plastic material is then metered by the metering zone C.

Next, a result of a comparative performance test of a conventional full flight screw (D=60 mm, full length L/D=19), a conventional barrier screw (D=60 mm, full length L/D=19) having a subflight at a middle portion of a channel formed by a main flight, and the barrier screw 10 (D=60 mm, full length L/D=19) according to the present invention is shown before, in order to clarify the effect of the barrier screw 10 according to the present invention.

In barrier screw 10 according to the present invention, feed zone L/D=7, compression zone L/D=8, metering zone L/D=4. The subflight is developed at a position where L/D is substantially 9, and the melt channel 14 is developed at a position where L/D is substantially 11.

The compression ratios of the three types of screws are all 2.5.

As for each type of screw, the variation of the injection pressures and the variation of the temperatures of the material passing through a nozzle of the screw are measured, and the material is melted and mixed under the following same conditions and then purged at the same low speed of 8% injection speed through the nozzle having a same diameter of 1 mm. The measurement results are as shown in Table 1, FIGS. 2A-2C and FIGS. 3A-3C.

Test condition (1) Used plastic material: Polypropylene (PP)
(2) Number of revolution of screw at a metering time: 120 rpm
(3) Back pressure at metering time: 5 kgf/cm$^2$
(4) Measuring stroke: 300 mm (5D)

TABLE 1

|  | Injection pressure (kgf/cm$^2$) | | | Temperature of material passing through nozzle (°C.) | | |
| --- | --- | --- | --- | --- | --- | --- |
|  | maximum value | minimum value | variation | maximum value | minimum value | variation |
| Conventional full flight screw | 31 | 15 | 16 | 243 | 232 | 11 |
| Conventional barrier screw | 16 | 11 | 5 | 246 | 241 | 5 |
| Barrier screw according to the present invention | 17 | 14 | 3 | 240 | 238.5 | 1.5 |

Figure 2A:
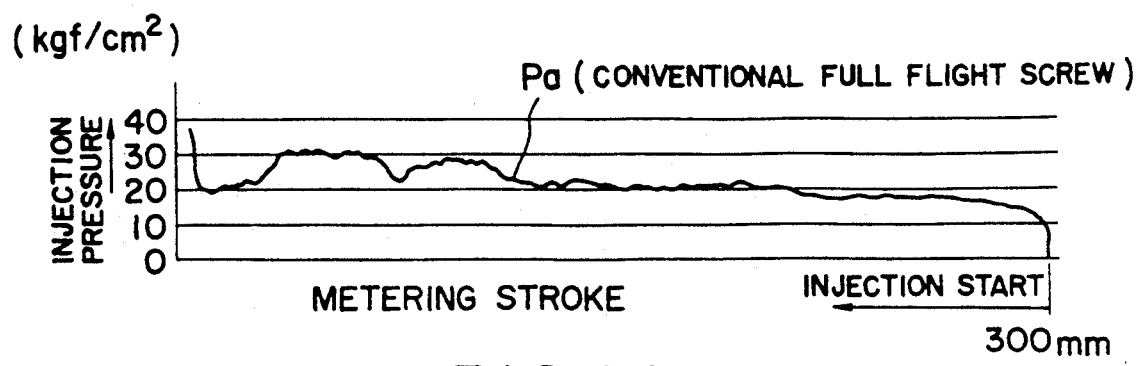
FIGS. 2A, 2B and 2C are diagrams showing variation test results of injection pressures of a conventional full flight screw, a conventional barrier screw and the barrier screw according to the present invention.
Figure 2B:
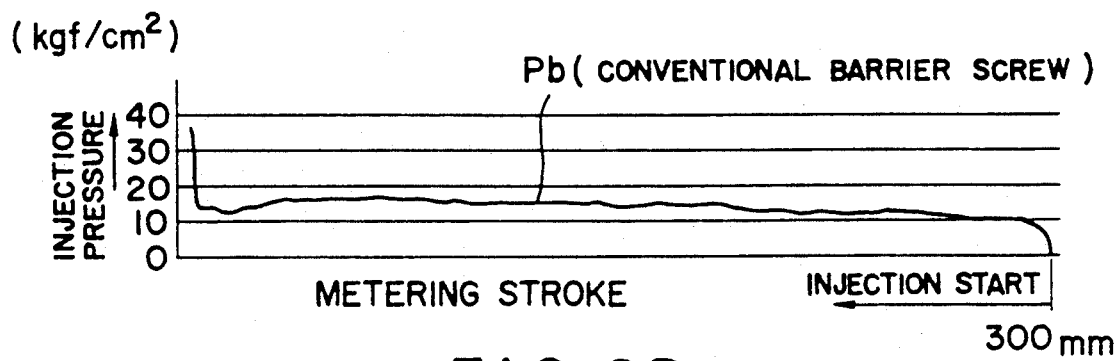
Figure 2C:
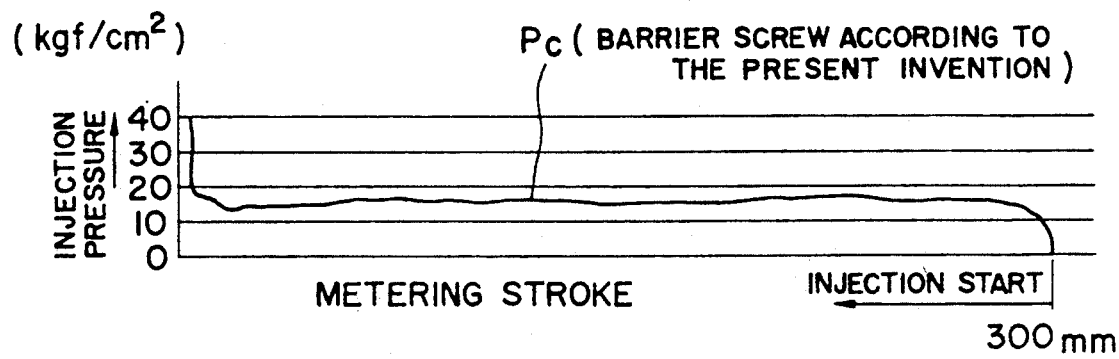
Figure 3A:
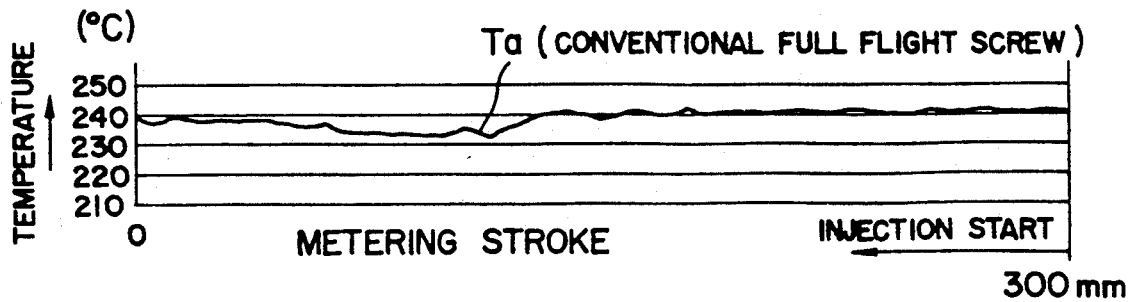
FIGS. 3A, 3B and 3C are diagrams showing temperature variation results of material passing through the nozzles of the three types of screws mentioned above.
Figure 3B:
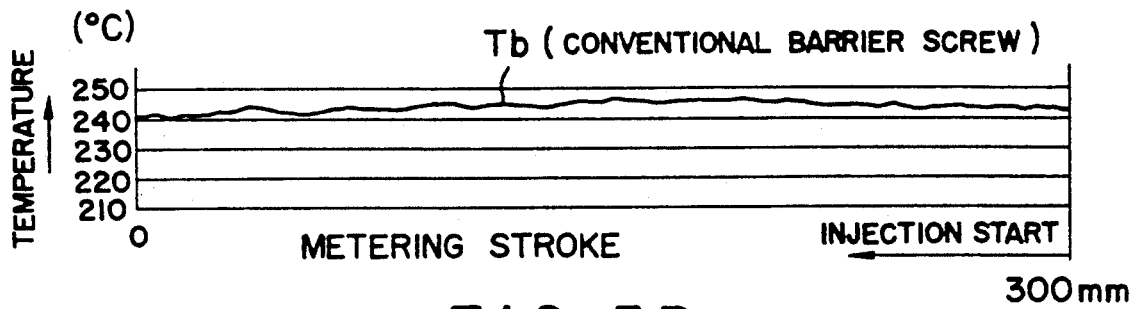
Figure 3C:
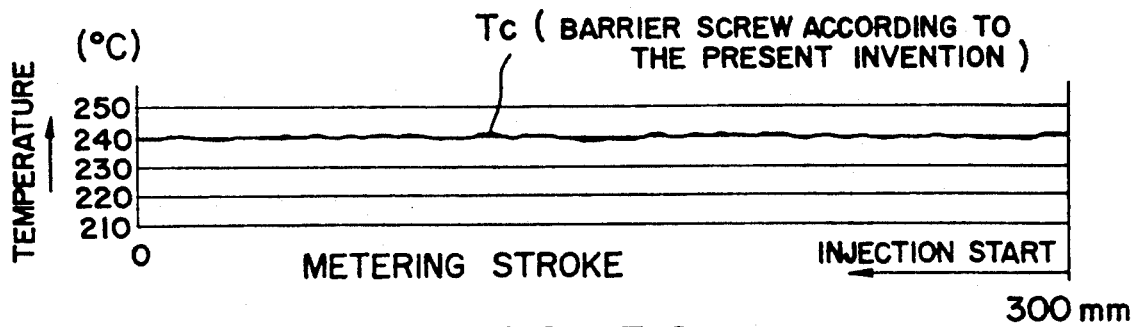

FIGS. 2A-2C are diagrams showing injection pressures Pa, Pb, Pc of the three types of screws, and FIGS. 3A-3C are diagrams showing temperatures Ta, Tb, Tc of material passing through nozzle of the screws.

As shown in Table 1, FIGS. 2A-2C and FIGS. 3A-3C, the variation of the injection pressures and the variation of the temperatures of material passing through the nozzle of the barrier screw according to the present invention are smaller than those of the other two screws. The results show that in the barrier screw according to the present invention the melted material to be injected is more uniformly plasticized and that the melted material is sufficiently mixed. In addition, the results show that the maximum temperature of the material passing through the nozzle of the barrier screw according to the present invention is the lowest, and that the material is naturally and uniformly plasticized.

Figure 4A:
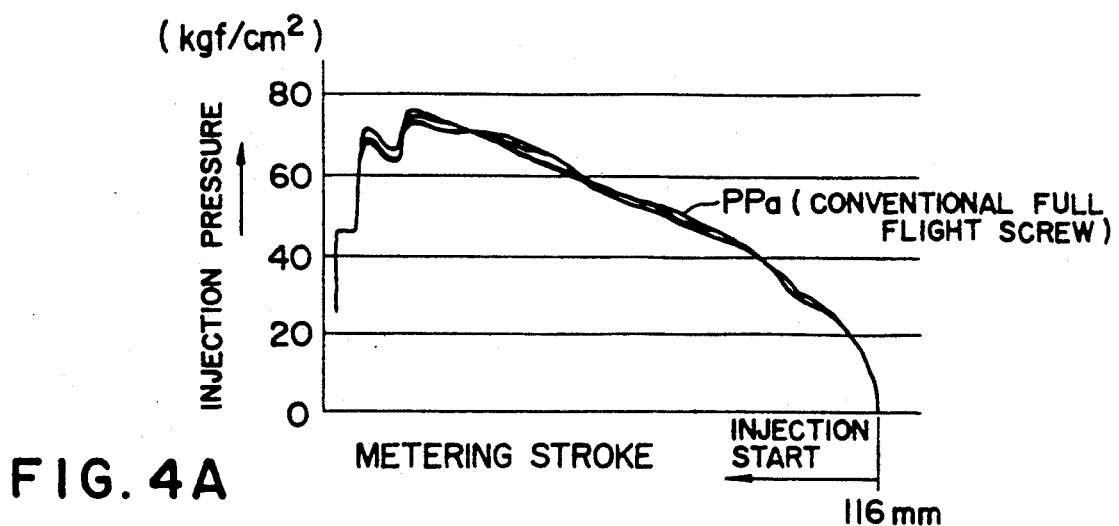
FIGS. 4A, 4B and 4C are diagrams showing injection pressure profiles in accordance with several times of the three types of screws mentioned above.
Figure 4B:
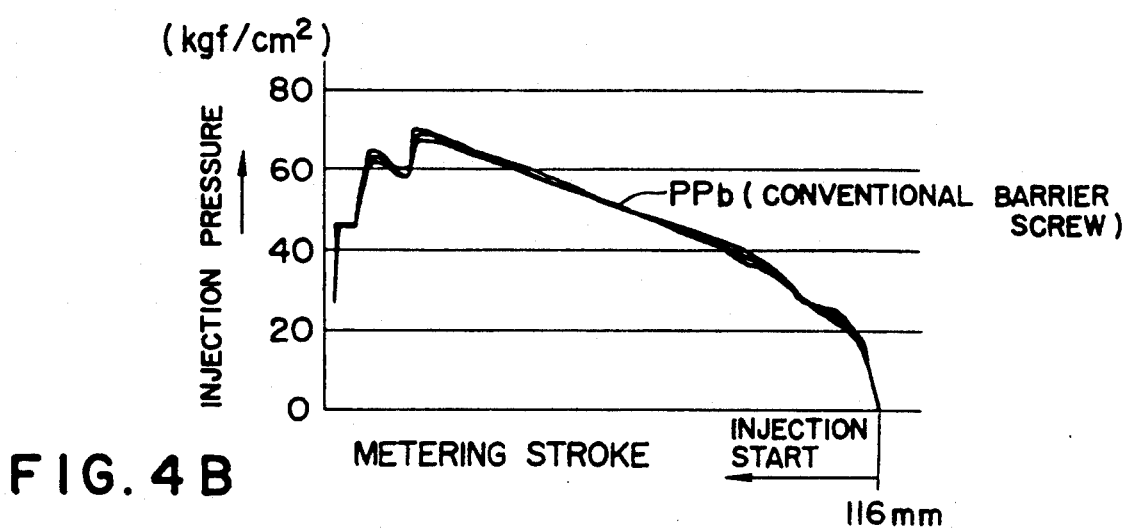
Figure 4C:
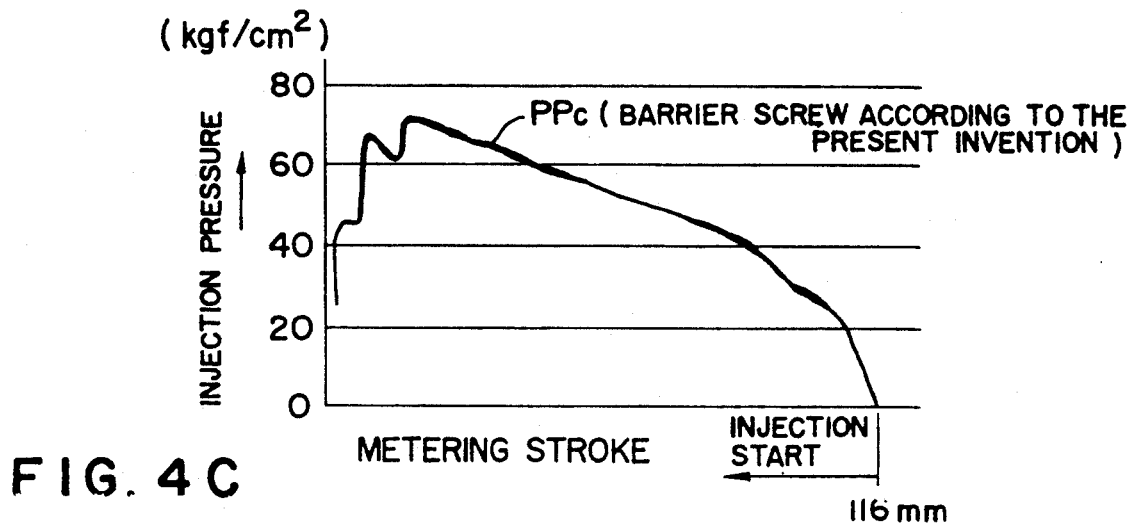

FIGS. 4A-4C are diagrams showing injection pressure profiles PPa, PPb, PPc of the three types of screws, where washing buckets having a weight of 245 g are molded. FIG. 4A shows the injection pressure profiles PPa in accordance with five shots which overlay each other. FIGS. 4B and 4C show the injection profiles PPb and PPc in accordance with ten shots which also overlay each other.

In FIGS. 4A-4C, the used plastic material is polypropylene (PP), the number of revolutions of a screw at a measuring time is 196 rpm, the back pressure at a measuring time is 15 kgf/cm$^2$, the measuring stroke is 116 mm, and the injection time is 8 seconds.

As shown in FIGS. 4A-4C, the stability for repeating the mold of the barrier screw according to the present invention is higher than that of the other screws. This shows that the barrier screw according to the present invention can precisely mold a molding having a complex structure. Furthermore, it is found that the molding molded by the barrier screw of the present invention does not have any defects such as silver streaks or burning spots and is effective in the dispersion of a master batch.

When the height of the subflight 12 of the barrier screw according to the present invention becomes higher downstream, and the difference g between the top (the line 11a) of the main flight 11 and the top of the subflight 12 becomes smaller downstream, the barrier screw may further improve the plasticate uniformity.

Figure 5A:
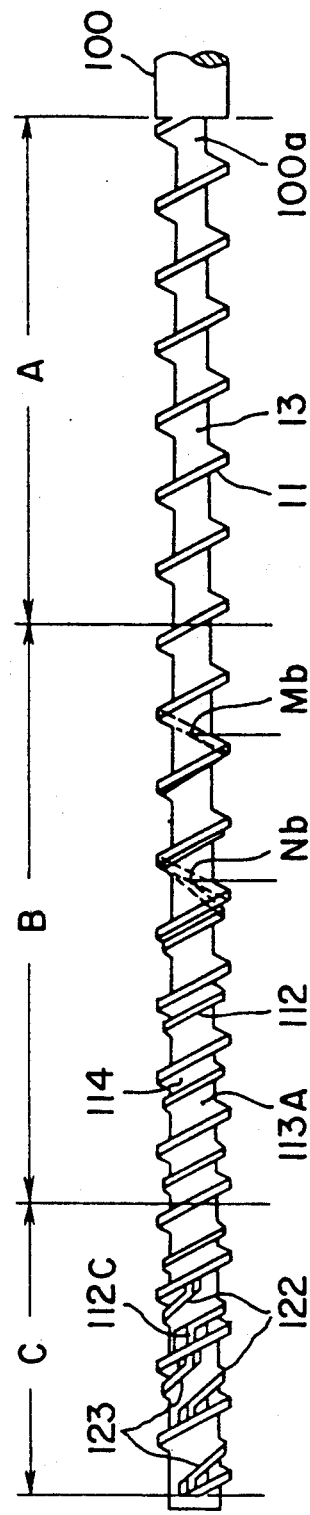
FIG. 5 is a side view showing a barrier screw according to a second embodiment of the present invention.

FIG. 5A shows a profile of a barrier screw 100 according to a second embodiment of the present invention.

In FIG. 5A, the barrier screw has a shaft 100a, a first subflight 112 and two second subflights 122, 123 provided on the shaft 100a. The first subflight is developed from a point Mb which is about one pitch toward the feed zone A from the point Ma (FIG. 1A). A melt channel 114 is developed from a point Nb which is about one pitch toward the feed zone A from the point Na. The first subflight 112 joins with the rear surface of the main subflight 11 at a point 112C which is about two pitches toward the compression zone B from the front end of the screw. The first subflight 112 is so formed as to have substantially the same function as the subflight 12.

The second subflights 122, 123 are so formed as to extend by two pitches from the end point 112C of the first subflight 112. That is, the second subflight 122 is started immediately behind the end point 112C, extends by one pitch and joins with the main flight. The second subflight 123 is also started immediately behind the joining point of the second subflight 122, extends by one pitch and joins with the main flight. The second subflights 122, 123 are formed in a two-step manner, for improving a dispersion effect of the material.

Figure 5B:
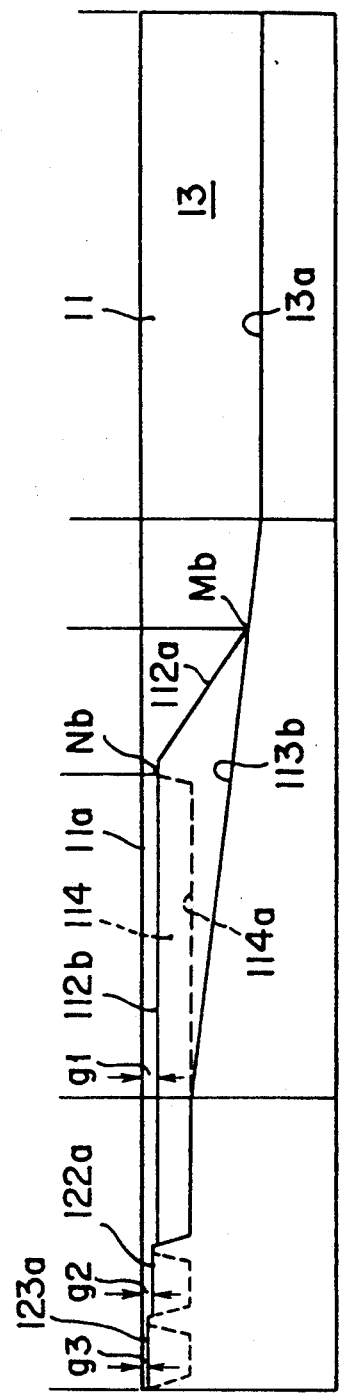

The second subflight may be formed in one step manner. In this case, the second subflight extends by about one or more than one pitch. Preferably, the top 122a of the second subflight 122 is higher than the top 112b of the first subflight 112, and the top 123a of the second subflight 123 is higher than the top 122a of the second subflight 122, as shown in FIG. 5B. Gaps g1-g3 are formed between the top 11a of the main flight 11 and the tops 112b, 122a, 123a of the subflights 112, 122, 123 respectively. Preferably, the gap g1 is about 0.7-1.0 mm, the gap g2 is about 0.5 mm, and the gap g3 is about 0.3 mm, when D is 60 mm.

The operation of this embodiment is similar to that of the first embodiment. That is, the plastic material is successively melted and mixed in the feed channel 13, a solid channel 113A and a melt channel 114. The melted material is then further mixed together by the second subflights 122, 123 provided around an end portion of the melt channel 114. In this way, the melted material is more adequately melted and the dispersion effect thereof is improved.

According to this embodiment, in particular, the color dispersion of the material is improved, and even in the case of 80 times master batch the color dispersion of the material is adequately improved. Accordingly, the back pressure of the screw can be lowered and therefore the plasticate capacity can be improved.

Below are shown molding examples of the second embodiment. The size of the barrier screw 100 of the second embodiment is substantially the same as that of the barrier screw 10 of the first embodiment used for the comparative performance test except for providing the first and second subflights 112, 122, 123 in place of the subflight 12 as shown in FIG. 5A.

MOLDING EXAMPLE 1

Moldings: Tag box, 395 g

Molding condition (1) Used plastic material: polypropylene (PP)
(2) Master batch: 80 times
(3) Number of revolution of screw at a metering time: 200 rpm
(4) Back pressure at a metering time: 4 kgf/cm$^2$

Molding result

The color dispersion is good. The plasticate capacity is also improved and the time of the molding cycle is reduced from 40 seconds to 32 seconds.

MOLDING EXAMPLE 2

Moldings: Container, 1970 g

Molding condition (1) Used plastic material: Polypropylene (PP)
(2) Master batch: 30 times
(3) Number of revolution of screw at a metering time: 126 rpm
(4) Back pressure at a metering time

Molding result

The color dispersion is good. The plasticate capacity is also improved and the time of the molding cycle is reduced from 85 seconds to 74 seconds.

According to the present invention, the plastic material may be more sufficiently melted and mixed, and may be more uniformly plasticized, even if the barrier screw is relatively short. Accordingly, the color dispersion effect of the material, becomes higher, and the causes of defects such as silver streaks or burning spots may be eliminated. Furthermore, when the barrier screw has the first and second subflights, the color dispersion effect of the material may become even higher, and the plasticate capacity may be improved by lowering the back pressure. In this case, melted material remaining by the second subflight is eliminated, and therefore the color change or the material change are not affected.

What is claimed is:

1. A barrier screw having a feed zone, a compression zone, and a metering zone comprising:
   a shaft;
   a main flight provided on the shaft extending from a start portion of the feed zone to an end portion of the metering zone defining a feed channel; and
   a subflight provided on the shaft extending from the compression zone to the metering zone, the subflight having a larger lead angle than the main flight;
   the subflight diverging from a front surface of the main flight at a point of the compression zone which is at least one pitch toward the metering zone from a starting point of the compression zone, the subflight joining with a rear surface of the main flight at an end portion of the metering zone, the subflight defining a melt channel with the main flight;
   the melt channel having a substantially constant depth suitable for mixing along with the whole length of the melt channel,
   wherein the height and width of the subflight are gradually increased to a predetermined height which is less than that of the main flight and a predetermined width which is narrower than that of the main flight, respectively, for one or more pitches, and wherein the melt channel is developed after the height and width of the subflight reach the predetermined height and the predetermined width.

2. The barrier screw according to claim 1, wherein a difference between a top of the main flight and a top of the subflight is substantially constant along the while length of the melt channel.

3. The barrier screw according to claim 1, wherein a difference between a top of the main flight and a top of the subflight is gradually decreased toward the end portion of the melt channel.

4. The barrier screw according to claim 1, wherein the subflight is a first subflight joining with the main flight at a point in the metering zone, and wherein a second subflight is developed near the joining point of the first subflight in the metering zone and extends by at least one pitch to an end portion of the metering zone.

5. The barrier screw according to claim 4 wherein the second subflight comprises several distinct portions which are formed in a stepped manner.

6. The barrier screw according to claim 4, wherein a difference between a top of the main flight and a top of the second subflight is smaller than a difference between the top of the main flight and a top of the first subflight.

* * * * *